United States Patent
Forman et al.

(10) Patent No.: US 9,064,119 B2
(45) Date of Patent: Jun. 23, 2015

(54) INFORMATION SCANNING ACROSS MULTIPLE DEVICES

(75) Inventors: George Forman, Port Orchard, WA (US); Kave Eshghi, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1832 days.

(21) Appl. No.: 12/242,998

(22) Filed: Oct. 1, 2008

(65) Prior Publication Data

US 2010/0083346 A1 Apr. 1, 2010

Related U.S. Application Data

(60) Provisional application No. 61/024,518, filed on Jan. 29, 2008.

(51) Int. Cl.
G06Q 99/00 (2006.01)
G06F 21/57 (2013.01)
G06F 21/55 (2013.01)
H04L 29/06 (2006.01)
G06F 17/30 (2006.01)
G06F 17/00 (2006.01)

(52) U.S. Cl.
CPC .......... *G06F 21/577* (2013.01); *G06Q 2220/12* (2013.01); *G06Q 2220/10* (2013.01); *G06F 17/30* (2013.01); *G06F 17/00* (2013.01); *G06F 21/55* (2013.01); *H04L 63/0876* (2013.01); *H04L 63/20* (2013.01)

(58) Field of Classification Search
CPC ..... G06F 17/00; G06F 17/30; G06Q 2220/10; G06Q 2220/12
USPC .......................................... 705/50, 51; 726/26
See application file for complete search history.

(56) References Cited

U.S. PATENT DOCUMENTS

2009/0171888 A1* 7/2009 Anglin .............................. 707/2

OTHER PUBLICATIONS

Forman et al. (Non-patent Literature, "Finding Similar Files in Large Document Repositories", 7 pages, KDD '05, Aug. 21-24, 2005, Association for Computing Machinery).*
Forman et al. (Non-patent Literature, Finding Similar Files in Large Document Repositories:, 7 pages, KDD '05, Aug. 21-24, 2005, Association for Computing Machinery.*

* cited by examiner

*Primary Examiner* — James D Nigh
(74) *Attorney, Agent, or Firm* — Joseph Swan

(57) ABSTRACT

Provided are, among other things, systems, methods and techniques for scanning information across multiple different devices. In one representative system, remote data-processing devices are provided with scanning applications that repeatedly scan information on their respective data-processing devices to identify matching data units that satisfy a specified matching criterion, the specified matching criterion including required matches against a set of screening digests, and then transmit characteristic information regarding the matching data units; and a central processing facility receives the characteristic information from the remote data-processing devices and determines whether the corresponding matching data units satisfy a policy criterion.

22 Claims, 6 Drawing Sheets

US 9,064,119 B2

INFORMATION SCANNING ACROSS MULTIPLE DEVICES

CROSS REFERENCE TO RELATED APPLICATIONS

This Application claims the benefit under 35 U.S.C. §119(e) of U.S. Provisional Application Ser. No. 61/024.518, filed Jan. 29, 2008, entitled "Information Scanning Across Multiple Devices."

FIELD OF THE INVENTION

The present invention pertains to systems, methods and techniques for scanning information across different devices and is useful, e.g., in scanning enterprise personal computers for designated sensitive data.

BACKGROUND

From time to time, there have been well-publicized incidents in which a laptop computer is stolen from an individual, or otherwise lost by the individual, and the computer is discovered to have contained highly sensitive data. Such highly sensitive data can include, for example, personal information for a large number of individuals (e.g., telephone, Social Security or credit card numbers), company trade-secret or other confidential information, or even information pertaining to national security.

Thus, for several years chief information officers (CIOs), chief technology officers (CTOs) and others have been asking for products/solutions that allow them to identify such vulnerabilities. However, as yet, there has not been a solution that is fully acceptable.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

One important aspect of information security is determining where certain files or even smaller chunks of information are stored on various computers throughout an enterprise. This problem is complicated by the fact that any given enterprise can have hundreds or thousands of computers, which are not necessarily all in constant communication with each other.

Figure 1:
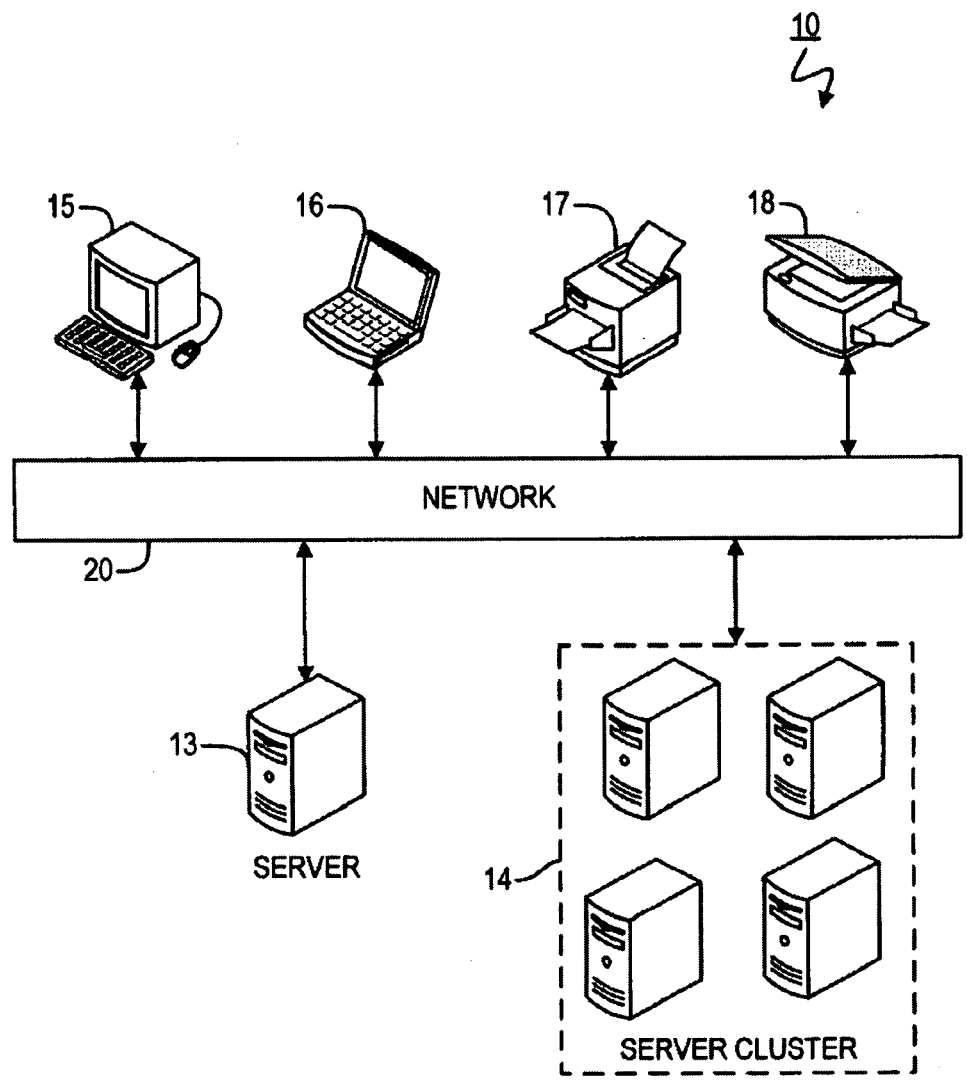
FIG. 1 is a block diagram of an enterprise network system according to a representative embodiment of the present invention.

One example of an enterprise network system 10 is shown in FIG. 1. Within such a system 10, various types of data-processing devices, such as servers (e.g., file servers or e-mail servers, which maybe implemented as individual servers 13 and/or as server clusters 14, the latter typically including multiple individual servers that together function as a single logical unit), personal computers (e.g., desktop computers 15 and laptop computers 16) and peripheral devices (e.g., printers 17 and scanners 18, as well as multifunction devices that combine aspects of one or more of such devices), communicate with each other over a network 20. For purposes of the following discussion, any reference to an individual server 13 also is intended to encompass a server cluster functioning as a single logical unit, unless specifically stated to the contrary.

As indicated above, certain of an enterprise's data-processing devices 13-18, primarily the laptop computers 16 might connect irregularly to the network 20. For example, an employee typically would connect his or her laptop computer 16 to the network 20 (either wirelessly or using a hardwired connection) while in the office, and then disconnect the laptop computer 16 when traveling or otherwise working remotely. Also, in certain cases, an employee might load files onto a laptop computer 16 (or other portable data-processing device, such as a personal digital assistant (PDA) or PDA telephone) without establishing a connection to the network. For example, the employee might first copy files onto a Secure Digital (SD) card or other memory or storage device and then transfer the files from such memory or storage device into his or her portable data-processing device, or instead simply insert such memory or storage device into the portable data-processing device and access the files directly from the portable storage device.

On the one hand, the use of large numbers of data-processing devices 13-18 in a variety of different ways, as well as the ability to easily share information, can significantly improve an enterprise's efficiency. On the other hand, as noted above, such easy transfer of data raises significant security concerns. In order to address these concerns, enterprises typically create policies regarding where information can be located and under what circumstances. However, employees may not be aware of one or more of such policies (particularly when there are large number of them), might accidentally violate them even if they are aware of them, or might attempt to intentionally violate them, either for a malicious purpose or simply based on a perceived notion that it will make their jobs easier.

Several different approaches can be employed to enforce policies pertaining to sensitive data items (SDIs). In addition, different approaches can be combined into a single information security system. One example is information security system 50 shown in FIG. 2. Generally speaking, system 50 contemplates a number of different storage locations, such as locations 52-55. Although shown as discrete locations 52-55, in practice the storage locations typically will be arranged in a hierarchy, e.g., with a device's hard drive divided into folders and subfolders, potentially having different properties (e.g., encryption, user access and/or availability over the network 10); however, it should be noted that one or more of the locations 52-55 could be a single folder or even a single file. Also, although only four locations 52-55 are illustrated, in many situations there will be thousands of different storage locations.

In addition, there typically will exist a number of policies 57 (although there could be just a single policy) specifying where particular kinds of information can be stored and under what circumstances, or at least specifying that a record must be kept of where certain information is stored. For example, certain kinds of information might be acceptable for storage on secure desktop computers 15 (e.g., desktop computers 15 that do not have Internet access or that have appropriate software for preventing such information from being transmitted over the Internet), but not for storage on a laptop computer 16. In the preferred embodiments, each policy includes a policy criterion defined by reference to specified items of information (e.g., documents containing three or more employee names and associated Social Security numbers) and a policy action that is to be performed when the policy criterion is satisfied (e.g., send an alert to a specified individual or simply record the identity and location of the document). Typically, such policies 57 will have been defined through user input 58, although in certain embodiments some or all of the policies 57 are generated automatically, e.g., by software applications.

For purposes of the present invention, at least some of the policy criteria for policies 57 preferably are defined by reference to specific chunks of data, e.g., data chunks having been tagged as being sensitive. Examples can include customer credit card information, employee Social Security numbers or company trade secret information. As discussed in more detail below, such tagging preferably is performed manually, in an automated manner, or through some combination of the two.

Figure 2:
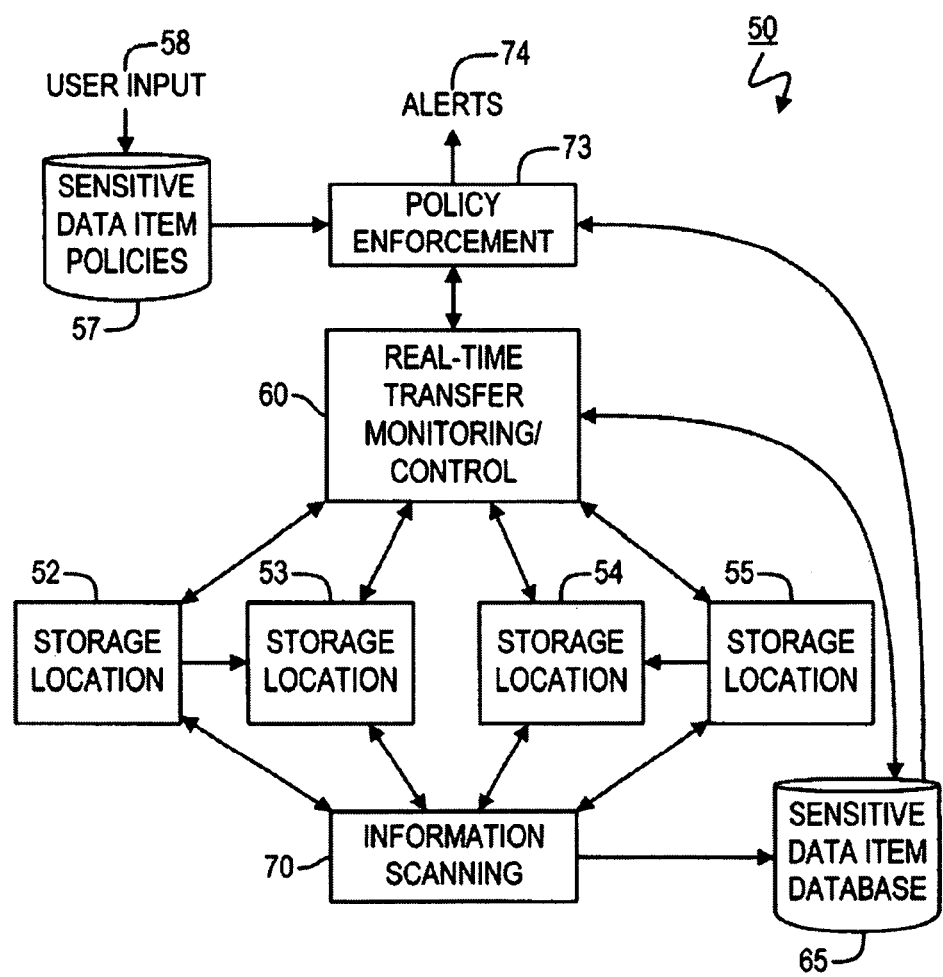
FIG. 2 is a conceptual block diagram of an information security system according to a representative embodiment of the present invention.

One potential approach to identifying where sensitive information is located is to perform real-time monitoring of document and other data transfers, e.g., in module 60 (shown in FIG. 2). For example, if it is known (e.g., by reference to a database 65 of known storage locations for SDIs) that a particular document containing one or more SDIs is stored in location 52 and the user presently is copying the document to location 53, then module 60 preferably records (e.g., in database 65) the fact that the subject SDIs now are also present within that document at location 53. Because module 60 ideally is aware of each transfer of data that occurs, in certain embodiments it is implemented within an operating system or is otherwise capable of monitoring all copying and moving of documents and information within documents (e.g., pursuant to any copy-and-paste or cut-and-paste operation).

In such embodiments, a module 60 preferably is implemented on each data-processing device within system 10. Unfortunately, it is noted that the approach of module 60 alone would require the ability to perfectly identify every copy or transfer of SDIs in real-time and would provide no ability to recover from errors. Thus, as a practical matter, the level of security provided most likely would be insufficient.

A different approach, employed by module 70, is to perform ongoing scanning of the information on each of the devices 15-18, or at least each of the devices 15-18 that is deemed to pose a security risk, within system 10. This is the approach upon which the present invention focuses. Generally speaking, module 70 attempts to identify locations where SDIs are stored, or at least those locations that satisfy a specified criterion pertaining to the storage of SDIs.

Although module 70 is shown conceptually in FIG. 2 as a single unit, as described in more detail below, in the preferred embodiments of the invention module 70 actually consists of distinct components spread across multiple different devices. Also, it should be noted that although the present disclosure speaks mainly in terms of identifying locations where SDIs are stored, the present invention is in fact generally applicable to detecting the locations of any kind of information throughout an enterprise or even across different enterprises. Accordingly, any references herein to SDIs or similar terms should be understood as pertaining to the preferred embodiments of the invention and, in other embodiments, such tens are replaced by generic references to information.

In any event, ongoing scanning performed by module 70 detects, typically over an extended period of time, files or other data units that satisfy one or more specified matching criteria pertaining to matches against a set of designated data chunks. Upon doing so, that information is stored into SDI database 65 which, in turn, preferably is accessed by the policy enforcement module 73. Upon the detection of a policy violation (or other instance in which the corresponding policy criterion is satisfied), policy enforcement module 73 performs the corresponding policy action (e.g., issues alerts 74 or simply adds a record to a monitoring database), preferably as specified in the applicable policy definitions within policy database 57.

Although either real-time monitoring component 60 or scanning component 70 can be implemented separately, in the present system 50 they are implemented together. Such a combination often can provide increased confidence as to the locations of designated data chunks (e.g., SDIs), as well as the ability to identify actual or potential policy violations in real-time. As to the latter, by incorporating real-time control into module 60, it is possible, e.g., to block a transfer before it occurs or take other appropriate action within a short period of time after an inappropriate transfer has occurred.

Turning in more detail to module 70, an important aspect of any information security system is the ability to know where certain information is stored throughout a system. For this purpose, the present invention generates and/or otherwise obtains a set of designated chunks of information and then, among other things, addresses the problem of identifying where those designated chunks are found across multiple different data-processing devices (e.g., personal computers within an enterprise). Several different approaches might be tried to achieve this goal.

First, one could copy all enterprise file systems (all employee laptop, desktop & server disk information) to a secure computer, where they are scanned for data that matches the designated chunks. The main advantage of this approach is that the designated chunks themselves remain secure. That is, they are not released outside of a secure computer. Unfortunately, this approach typically would involve an enormous amount of copying and a corresponding demand on the network, as well as on the storage and computing resources of the secure computer.

Second, much like virus scanning, one could instead distribute the scanning task to all the individual computers in the enterprise, giving each a copy of the SDIs to scan for. This approach leads to much less copying and nicely distributes the computer resource demands for scanning. Unfortunately, this approach significantly increases the risk of exposure of the SDIs, even if they were encrypted up to the point that the scanning software needs to compare against them.

Third, one could just distribute cryptographic hash codes for the SDIs, i.e. cryptographically strong hashes that serve as fingerprints to uniquely identify them without revealing their information. While more secure than the immediately preceding approach, any user with a copy of such hash codes could scan local portions of the infrastructure and discover any highly sensitive files to which he or she has access. In addition, if the nature of the SDIs is known (e.g., if it is known that the SDIs include Social Security numbers) and the individual SDIs are short enough (e.g., only a billion possible Social Security numbers), one could hash all of the possibilities and discover which ones have matches in the set of hash codes. Both of these are significant and, typically, unacceptable security risks.

Figure 3:
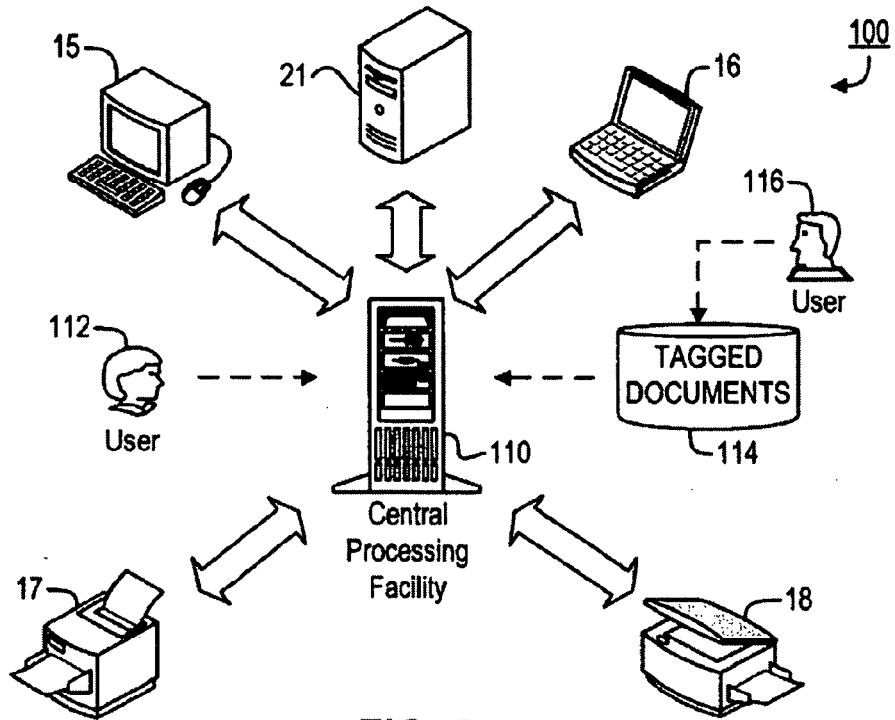
FIG. 3 is a block diagram of a screening system according to a representative embodiment of the present invention.

The preferred embodiments of the present invention use a combination of local and central processing, together with additional blinding of the information pertaining to the SDIs so as to achieve a good balance of security and processing/communication efficiency. A block diagram of a system 100 according to a representative embodiment of the present invention is shown in FIG. 3. Included within system 100 is a central processing facility 110 which preferably is a secure computer within the subject enterprise. One goal of system 100 is to monitor various different types of data-processing devices, such as personal computers (e.g., desktop computer 15 and laptop computer 16) and servers 13. In addition, it sometimes will be desirable to scan the memory or any bulk storage of various peripheral devices, such as printers 17 or scanners 18 for the existence of SDIs (e.g., to determine whether sensitive data is being printed or scanned), provided that such devices actually process text or other machine-readable data formats.

As indicated above, one aspect of system 100 is to identify information on various data-processing devices that matches designated information (e.g., information that that has been designated as being confidential or sensitive). In the present embodiment, a user 112 can directly designate such information to central processing facility 110 and/or central processing facility 110 automatically searches existing file systems 114 to find particular files or other data units that have been flagged (e.g., as being sensitive), typically by one or more users 116.

Figure 4:
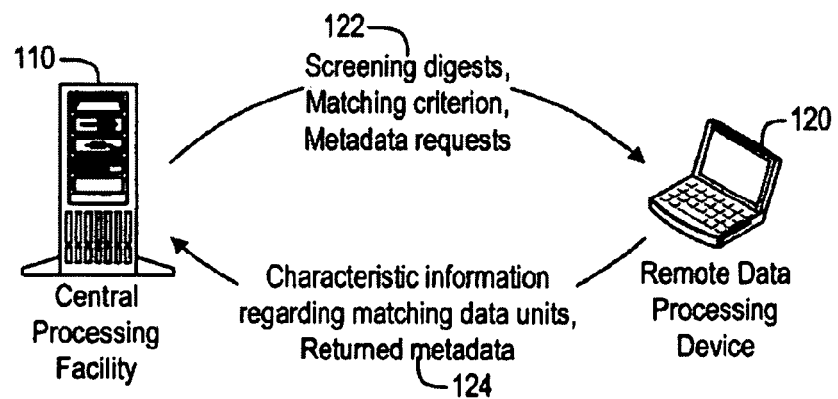
FIG. 4 is a block diagram showing the flow of information between a central processing facility and a remote data-processing device according to a representative embodiment of the present invention.

FIG. 4 is a block diagram showing the flow of information between central processing facility 110 and a remote data-processing device 120 (illustrated as a laptop computer 16) according to a representative embodiment of the present invention. Specifically, in this embodiment the central processing facility 110 provides data-processing device 120 with certain information 122 for identifying matching documents, files or other data units, as well as requests additional information about the identified documents, files or other data units. In return, the data-processing device 120 provides information 124 to central processing facility 110, including characteristic information regarding any matching data units (e.g., files or documents) and, in certain embodiments, certain metadata about those matching data units.

Figure 5:
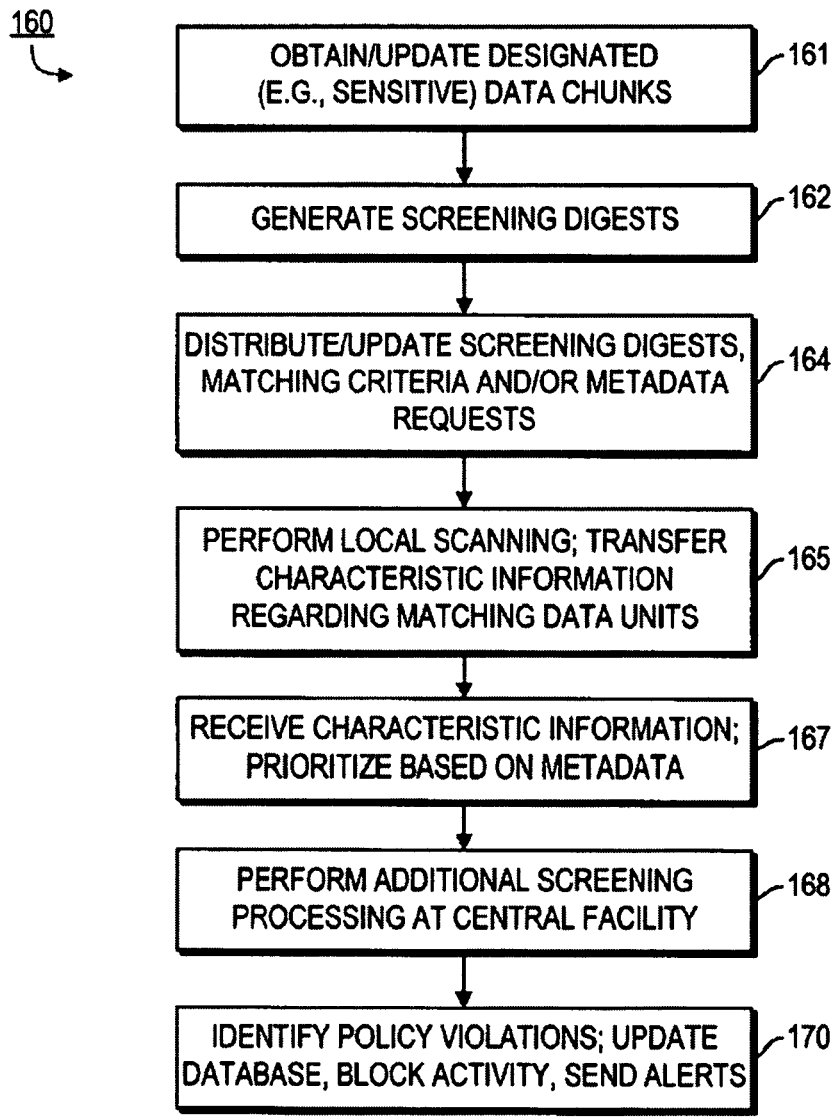
FIG. 5 is a flow diagram illustrating a process of identifying information across multiple different devices according to a representative embodiment of the present invention.

FIG. 5 is a flow diagram illustrating a process 160 of identifying information across multiple different devices according to a representative embodiment of the present invention. In the preferred embodiments of the invention, the steps in the process 160 are executed in an automated manner, so the entire process 160 can be performed by a programmed computer or, more preferably, by a system of interconnected programmed computers, or in any of the other ways described herein.

Initially, in step 161 a set of designated data chunks is obtained or, in certain cases, updated. As noted above, some user input typically is involved. In the simplest case, the user 112 simply supplies a set of SDIs that should be monitored, preferably also specifying relationships between individual SDIs. Such information can be provided by the user 112 in bulk form, e.g., with different kinds of SDIs (e.g., Social Security numbers, credit card numbers home addresses) mixed together or can be provided by the user 112 in a more formatted manner (e.g., in tabular form with name, home address, Social Security number, credit card number, etc. each in a different column and all of the information for a single individual in a single row), so that relationships between individual SDIs are apparent. In either event (i.e., irrespective of whether any relationships are specified), with such direct specification of the SDIs themselves, the process 160 preferably simply inputs such information in this step 161.

Alternatively, there might exist a database of files or other data units, some of which having been tagged (e.g., as including sensitive information) and/or some of which having individual data items within them that are tagged as being sensitive information. In this case, step 161 preferably searches through the database to identify the sensitive information. For example, if a specific item is tagged as being sensitive, then step 161 preferably simply designates it as a SDI. On the other hand, where entire documents or files, or even entire folders, are tagged as containing sensitive information, the additional processing described below preferably is performed.

In still further cases, only the parameters of different classes of SDIs are specified by the user (e.g., user 112 or 116), and step 161 searches through all documents in the file system or all files in designated locations within the file system so as to identify the SDIs based on those criteria. For example, a user 112 might specify that any string within the enterprise's personnel files of the form ###-##-####, where # is a single digit, is a SDI of the type "Social Security Number". In this example, step 161 preferably searches through in the designated locations looking for any data items that satisfy the specified criteria.

For cases in which entire documents, files or other relatively large data units are identified as containing SDIs, a chunking technique preferably is used to identify relevant chunks that will be designated as SDIs. Preferably, particular chunks are selected from the input data unit based on pre-specified selection parameters. The specific type of chunking technique applied preferably depends upon information (e.g., provided by a user 112 or 116) indicating the reason for which the document was designated.

For example, if a document is designated as containing individual SDIs, a parsing technique preferably is used to identify those items. Such parsing, as a default, preferably searches for all SDI types for which it has definitions. On the other hand, if some specific guidance information has been provided (e.g., indicating that the document includes customer payment information) then the parsing technique preferably only looks for corresponding SDI types (e.g., in the foregoing example, only credit card numbers or pairs of credit card number and customer name).

Alternatively, if a document (or a portion thereof) is designated as company trade-secret information, then a more generally applicable context-sensitive text-chunking technique preferably is used. For example, text may be chunked into paragraphs, sentences, clauses or shorter segments. In certain text-chunking techniques, all of the text is included within a chunk. In other techniques, only the most important words or phrases are selected and used (e.g., using a keyword extraction technique). The preferred embodiments use the text-chunking technique described in Forman, G., Eshghi, K., and Chiocchetti, S., "Finding similar files in large document repositories", In *Proceeding of the Eleventh ACM SIGKDD International Conference on Knowledge Discovery in Data Mining* (Chicago, Ill., USA, Aug. 21-24, 2005), KDD '05, ACM, New York, N.Y., 394-400, DOI=http://doi.acm.org/10.1145/1081870.1081916.

In either kind of chunking, in certain embodiments some amount of normalization pre-processing is performed so as to standardize the content being processed. Also, either of the foregoing techniques can be used when scanning files that have not been specifically designated as containing SDIs so as to automatically detect such information.

Figure 6:
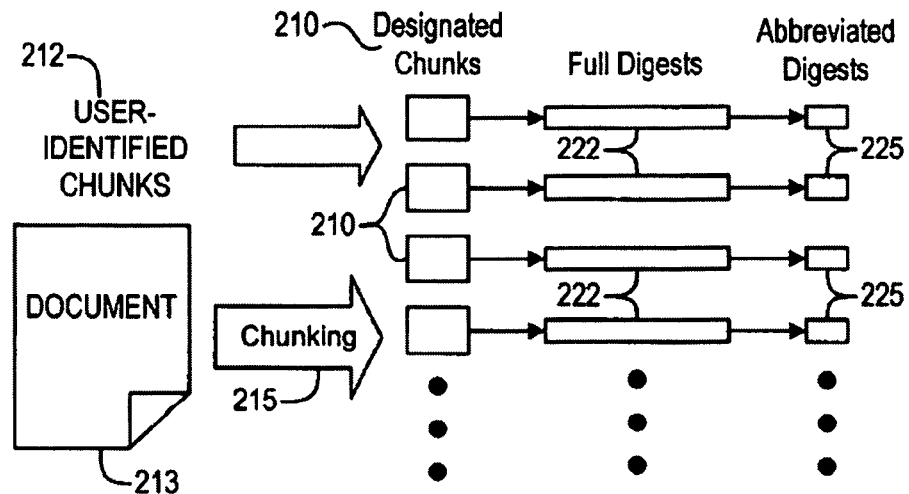
FIG. 6 conceptually illustrates the generation of abbreviated hashes from a document according to a representative embodiment of the present invention.

In any event, as shown in FIG. 6, the end result of step 161 preferably is a set of designated data chunks 210, some of which 212 potentially having been explicitly identified by users and others potentially having been extracted from a document 213 using one or more chunking techniques 215. Preferably, each such chunk 210 is relatively unique (e.g., larger than a single word), so that it is highly unlikely to find it accidentally within a document, and includes a different piece of sensitive information.

Referring back to FIG. 5, in step 162 a screening digest (or hash) preferably is generated for each of the designated chunks 220. It is noted that the terms "digest" and "hash" are used interchangeably herein and refer to a relatively short, typically fixed-length, string that is generated in a fixed, predetermined manner and is representative of some source data, typically having been calculated across all of such source data. A "cryptographic" hash has the property that it is extremely difficult to obtain the source data the hash alone, e.g., due to the length of the cryptographic hash (typically, a fixed length of at least 128 or 256 bits) and because slight changes in the source data preferably result in significant changes in the resulting hash value.

In the preferred embodiments, an abbreviated source digest 225 (illustrated conceptually in FIG. 6) is generated by first generating a full source digest 222, e.g., a cryptographic hash (e.g., MD5 or SHA-1, also illustrated conceptually in FIG. 6) of each designated chunk 210 and then shortening the full source digest 222, e.g., by simply truncating it to a desired length; such a shortening can be seen as a kind of "dumbing down" of the full digest. However, in alternate embodiments a shorter hash or digest is calculated at the outset and/or any other technique is used for shortening a longer (e.g., cryptographic) hash. Certain considerations pertaining to selection of an appropriate length for the screening digest are discussed below. However, for purposes of the present step, it is noted that it is a trivial matter to flexibly select any desired length (up to the length of a full cryptographic hash) by simply appropriately truncating an input cryptographic hash (e.g., 128 bits for MD5 or 256 bits for SHA-1). The abbreviated digests (e.g., as generated in any of the foregoing ways) preferably are designated as the screening digests in step 162.

Again returning to FIG. 5, in step 164 the screening digests (or updates to the same) are distributed (e.g., as part of information 122) to the remote data-processing devices 120 (e.g., desktop computers 15, servers 13, laptop computers 16 and, potentially, printers 17 and/or scanners 18, as shown in FIG. 3). As indicated, in the preferred embodiments the screening digest are abbreviated source digest that have been derived from full source digest.

In addition, other aspects of information 122 preferably are provided (or updated) as appropriate in this step 164. In the preferred embodiments, such information 122 is distributed and updated over network 20 each time the subject remote data-processing device 120 attaches to the network 20.

In addition to the screening digests, matching criteria and/or requests for metadata (or updates to either or both of the foregoing) preferably also are distributed. In the preferred embodiments of the invention, the matching criteria are derived from the policies 57, and the design of the matching criteria is interdependent with the design of the screening digests (e.g., the lengths of the screening digests). Preferably, the matching criteria define which documents, files or other data units will be returned from the various data-processing devices 120 by specifying the required number and/or types of matches to the screening digests (which can be generic or specific to different users, devices or data units). For example, the number of required matches can be fixed across all data units or be dependent upon characteristics (e.g., size) of the subject data unit (e.g., by specifying a minimum percentage of matches). Typically, an individual matching criterion will be defined by reference to hundreds, thousands, millions or even more screening digests (e.g., there must exist a match to at least one, or at least two, of the screening digests in the provided set which includes more than 1,000).

In the preferred embodiments, several considerations affect the designs of the matching criteria and screening digests. First, the screening system (e.g., system 50) ideally would identify every single document that satisfies the policy criterion for any policy 57 that is in effect (i.e., 100% recall). Second, return of a certain amount of irrelevant documents is not only acceptable, but in most cases it is preferable in order to disguise from potential malicious parties which documents contain sensitive information. Third, as already noted, the screening digests preferably are short enough that given a piece of data that matches any one of the screening digests, it should be quite uncertain whether the match indicates an actual SDI or whether it is just an accidental collision with the subject screening digest. The term "collision" is used herein in its ordinary sense, i.e., to refer to a matching of hashes or digests, typically where the underlying data do not match.

As an example, assume that there are one million distinct SDIs. If the sole policy is to identify any document that contains even one SDI, then the sole matching criterion should be selected such that any data unit that includes even a single match to one of the screening digests should be returned. If an average (or target) data unit includes 1,000 chunks that can be compared to that set of SDIs, then it is trivial to determine that truncating the screening digests down to 30 bits would cause more than 60% of the non-sensitive documents to randomly trigger the matching criterion. However, such a large return potentially could overwhelm the network and the applicable computer resources. By instead truncating the screening digests down to 40 bits, the random return rate drops to approximately 0.1% (i.e., one out of every thousand data units), which might be deemed an acceptable burden on the system's resources. It is noted that such a single screening-digest matching criterion can be used across an entire set of policy criteria, with the central processing facility 110 then sorting out which, if any, of the policy criteria are actually satisfied by the returned documents.

In many embodiments, it will be desirable to establish a minimum target return rate (or volume) and to set the length of the screening digests so as to achieve that minimum. The actual return rate also will depend upon the matching criterion, such as how many matches must be made, whether particular combinations of matches must be made or rather some overall score must be achieved with different matches having different weights. In some cases, as already noted, the matching criterion will be constrained by the policy criterion and the desire for 100% recall. If the policy criterion does not require return of any document that includes even a single SDI and/or if recall can be made flexible, e.g., with an emphasis toward identifying matching documents with larger numbers of SDIs (100% recall for these) but with a willingness to accept less than 100% recall for documents that might include only one or two SDIs, then greater flexibility is available in designing the screening-digest matching criterion, allowing the screening digests to be even shorter because more of the selectivity is performed by the matching criterion (e.g., a matching criterion requiring matches to at least two different screening digests).

Also, it should be noted that either or both of the matching criteria and screening digests can be user-specific (e.g., so that the devices associated with different owners receive different information 122), document-specific (e.g., so that only certain ones of the provided matching criteria are applied against certain document types) or device-specific (e.g., with laptop computers being screened more stringently than desktop computers within a relatively secure facility). Alternatively, in certain embodiments the same matching criteria and screening digests are applied uniformly, with the central processing facility 10 performing the more selective processing.

In this regard, as noted above, in certain embodiments central processing facility 110 requests return of specified kinds of metadata along with the characteristic information regarding the documents, files or other data units satisfying one or more of the matching criteria. Such requests for metadata can include, e.g., total number of matches, identification of which screening digests were matched and/or the order in which the matches occurred in the data unit or even the specific locations within the data unit at which the matches were found.

The information 122 preferably automatically is updated (e.g., as new SDIs are created or policies change) over time, and such updates preferably automatically are sent out to the various data-processing devices 120 (e.g., in a manner similar to distributing virus definitions to anti-virus software) as they are generated.

Preferably, steps 161, 162 and 164 are performed by the central processing facility 110. However, in alternate embodiments a different component of system 100 (not necessarily shown in FIG. 3) performs these functions.

Figure 7:
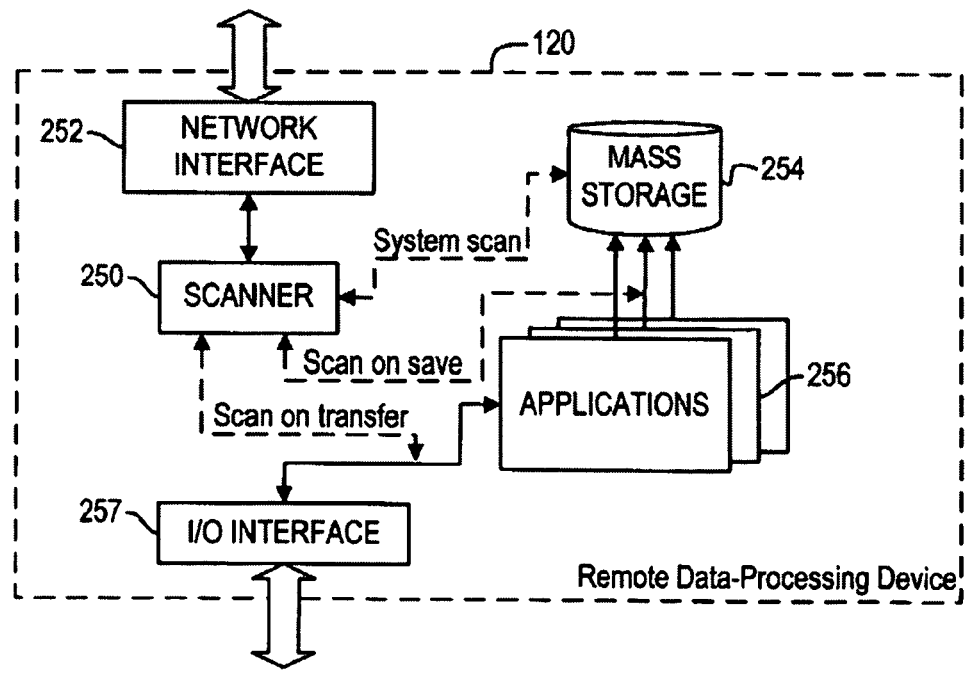
FIG. 7 is a block diagram showing certain aspects of a remote data-processing device according to a representative embodiment of the present invention.

In step 165, each of the remote data-processing devices uses the received information 122 to repeatedly scan its local information, e.g., over an extended period of time (and, in certain embodiments, information stored on storage devices and/or other devices attached to it). In this regard, FIG. 7 is a block diagram showing certain aspects of a remote data-processing device 120 according to a representative embodiment of the present invention.

Installed on each remote data-processing device 120 preferably is a scanning application 250. In certain embodiments, scanning application 250 is installed on each of the enterprise's computers and other data-processing devices 120 that are desired to be monitored. For example, scanning application 250 is part of the standard software installed on devices provided by the enterprise and/or is installed and updated each time a data-processing device 120 connects to network 20 (e.g., as a condition to logging onto network 20).

Scanning application 250 receives the screening digests and a matching criterion as part of information 122 (preferably via network interface 252), and uses this information to identify matching documents, files or other data units. In this regard, scanning application 250 preferably is configured to examine stored information in specified data units. In many cases, these data units will be individual documents or files. However, in certain embodiments (or in certain situations within a given embodiment) a data unit can include multiple files or can be just a portion of a single file.

In the preferred embodiments, scanning application 250 can operate in any of a variety of different modes, any or all of which potentially being activated at any given time. In any event, however, scanning application 250 preferably performs ongoing, repeated scanning of stored information based on the received screening digests (as the same may be updated from time to time) over an extended period of time. One potential mode of operation, "system scan", preferably is performed at periodic intervals or on an ongoing basis (e.g., when system resources are not being used, such as whenever there is system idle time) and scans every stored file, e.g., every file on the device's hard disk or other mass storage device 254. In a second mode, "scan on save", the scanning application 250 monitors when documents are saved to the device's mass storage 254 by any of the various applications 256 that currently are running and then scans them at that time (or at least schedules the scan if system resources are too occupied to perform it immediately). In a third mode, "scan on transfer", the scanning application 250 monitors when files are being transferred (copied or moved) via input and/or output (I/O) interface 257 (which can include network interface 252) to or from an external device (e.g., an external flash or hard drive or a separate networked device) by any of the various applications 256 that currently are running, and scans them at that time.

Figure 8:
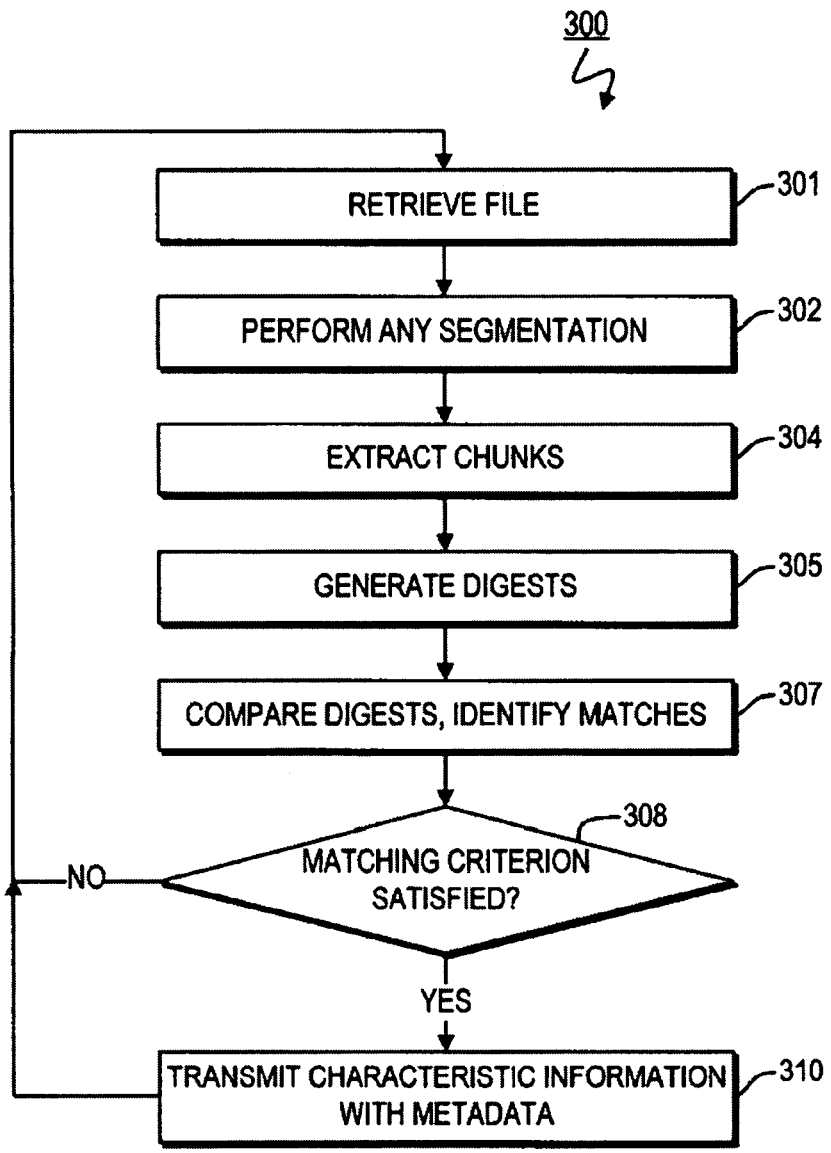
FIG. 8 is a flow diagram illustrating a process of scanning information, e.g., on a local hard drive, according to a representative embodiment of the present invention.

FIG. 8 illustrates a scanning process 300 that is used in certain embodiments of the invention by scanning application 250 for all such scanning modes. Preferably, the steps of process 300 are fully automated and therefore can be performed, e.g., by a processor executing computer-readable process steps up of a computer-readable medium, or in any of the other ways described herein.

Initially, in step 301 scanning application 250 retrieves a file. For example, in the "system scan" mode, scanning application 250 preferably just retrieves the next file on the hard disk or other mass storage device 254, while in the "scan on save" or "scan on transfer" modes, the retrieved file is the one that triggered the scan.

In step 302, any segmentation is performed. In this regard, in certain embodiments of the invention it is preferable to segment the scanned information into approximately equal-sized data units. Such an approach tends to preclude a bias toward larger files and also can make it easier to predict how much of the scanned data is likely to randomly satisfy the matching criterion (as discussed above). In such embodiments, files that are significantly smaller than the target size are combined with one or more other files to approximately match the target size, and files that are significantly larger than the target size are segmented into smaller data units so as to at least approximately achieve the target size. While this step is somewhat easier to implement in the "system scan" mode (where the order in which files are scanned can be determined at least in part based on size), it can also be implemented in the other modes, e.g. by deferring the scan of a smaller file until enough files can be aggregated or by combining a scanned file with other files selected from mass storage device 254.

In step 304, chunks are extracted from the subject data unit. Generally speaking, it is desirable to use the same (or similar, at least for parsing) chunking technique that was used with respect to the data units containing designated information (e.g., as described in step 161 above). In fact, however, in certain cases it often will be the case that less will be known about a particular data unit on a remote data-processing device 120 than is known about a corresponding data unit that has been designated as containing sensitive information. For example, a designation that a particular document contains sensitive information can be accompanied by an indication as to the kind of sensitive information it includes, e.g., lists of individual SDIs (in which a parsing technique preferably has been used) or descriptive matter that has been designated as trade-secret information (in which case a generalized text-chunking technique preferably has been used). Without this information to guide the chunking process in this step 304, it often will be preferable to perform several different kinds of chunking on a single data unit and compare each of the resulting sets of chunks.

In any event, in step 305 at least one scan digest preferably is generated for each of the chunks extracted in step 304. The technique for generating such digest preferably is identical to the technique used for generating the screening digests, e.g., as discussed in connection with step 162 using the technique described in connection with FIG. 6. Accordingly, in the preferred embodiments both a full scan digest and an abbreviated scan digest is generated for each of the chunks extracted in step 304.

In step 307, the generated scan digests (more preferably, the abbreviated scan digests) are compared against the received screening digests. Ordinarily, there will be a large number of screening digests, and such screening digests preferably have been indexed previously, making this comparison step 307 fast to execute. The resulting matches are then identified.

In step 308, a determination is made as to whether the subject data unit satisfies the specified matching criterion (or one of the matching criteria, if more than one has been provided). As noted above, in certain embodiments, any single match is adequate to satisfy the matching criterion. In other embodiments, or in other cases within a single embodiment, a minimum number of matches must be made and/or particular kinds of matches must be made in order to satisfy a particular matching criterion. As noted above, multiple matching criteria may have been provided, in which case satisfying any one preferably is adequate. If a matching criterion has been satisfied, then processing proceeds to step 310. Otherwise, processing returns to step 301 in order to retrieve the next file to be scanned (assuming that all data units corresponding to the current file have already been scanned).

In step 310, characteristic information regarding the data unit satisfying the matching criterion is transmitted to the central processing facility 110, together with any metadata. Such characteristic information can include, e.g., the entire data unit itself, just the full (e.g., cryptographic) scan digests from which the corresponding matching abbreviated scan digests were generated in step 305, or just those ones of the full scan digests that correspond to actual matches. Transmitting just full scan digests (e.g., either of the second or third options) typically will be adequate and requires less bandwidth than transmitting the entire contents of the matching data units themselves. Currently, it is preferred to transmit just the full scan digests that correspond to actual matches.

As noted above, central processing facility 110 preferably has the ability to request specific kinds of metadata. Also, particular kinds of metadata are provided by default in certain embodiments of the invention. Examples of different kinds of metadata have been described above. In addition, at least some default metadata ordinarily will be provided; for example, at least information identifying the location of the subject data unit (e.g., file path and file name) preferably is included as default metadata. Upon completion of step 310, processing returns to step 301 in order to retrieve the next file to be scanned (again, assuming that all data units corresponding to the current file already have been scanned).

Returning to FIG. 5, in step 167 the central processing facility 110 receives the characteristic information regarding the matching data units and then selects individual ones of the corresponding matching data units for additional processing and/or prioritizes some or all of the received matching data units, based on the associated metadata. It is noted that the distinction between prioritization and selection, as a practical matter, often will be one of degree, because the central processing facility 110 might never get around to processing the lowest-priority data units.

It is further noted that in certain embodiments, central processing facility 110 receives characteristic information regarding matching data units from hundreds or thousands of remote data-processing devices 120. In addition, because of the designed-in properties of the preferred embodiments which result in intentional collisions, hundreds or thousands of documents might be received from each such data-processing device 120. Accordingly, although prioritization is not performed in all embodiments, it is preferred.

In one representative embodiment, the received data units are prioritized based on how many matches occurred, with large numbers of matches having corresponding higher priorities. This approach tends to prioritize data units having a large amount of sensitive information.

In other embodiments, data-aware techniques are used to prioritize. In particular, in certain embodiments the central processing facility 110 has access to certain information regarding relationships between various SDIs that are not generally available to the remote data-processing devices 120 or others outside of central processing facility 110. This information disparity can be used advantageously in the prioritization process.

For example, in one embodiment only the central processing facility 110 knows that a screening digest for a particular chunk corresponds to a Social Security number and that the screening digest for another chunk corresponds to the name of the person to whom the Social Security number belongs. If both screening digests are matched in a particular data unit, the central processing facility 110 preferably assigns a higher priority than if two unrelated screening digests are matched in the same data unit. This kind of relationship can be referred to as a "database relationship".

Similarly, in another embodiment only the central processing facility 110 knows that a first screening digest corresponds to a particular text chunk and that another screening digest corresponds to a text chunk that follows the other chunk in a particular sensitive document. If both screening digests are matched in a particular data unit, the central processing facility 110 preferably assigns a higher priority than if two unrelated screening digests are matched in the same data unit. In addition, if the second screening digest corresponds to a text chunk that follows the text chunk corresponding to the first screening digest, an even higher priority preferably as assigned. This kind of relationship can be referred to as a "document-context relationship".

As will be apparent, the use of such relationship information can eliminate a significant amount of work because, in many embodiments, the lowest-priority data units might not ever be processed. On the other hand, a malicious person or entity without knowledge of these relationships typically would have to perform detailed analysis on every single data unit that is returned to determine whether it potentially contains sensitive information.

In addition, the identification of the relationship that exists in a received data unit preferably is used to steer the processing that is eventually performed (e.g., in step 168, discussed below). Accordingly, if it appears that a name and corresponding social security number for a particular individual have been found within a document, such processing preferably focuses on confirming that such information exists, determining whether there exists Social Security information for other people and/or determining whether there exists other personal information for the particular individual. Similarly, if text chunks for just a single document appear to have been found within a received data unit, the processing preferably focuses on verifying whether the received data unit (or particular file within the data unit) actually corresponds to that document.

In contrast, a malicious person or entity typically would have no way to focus its efforts because it would not know whether any given identify data unit matches randomly, might contain Social Security information, might contain certain specific kinds of other personal information, might be similar to some confidential document regarding proprietary technology or might be similar to any other kind of sensitive information or document.

In other words, as noted above, one aspect of the preferred embodiments of the present invention is to provide to the data-processing devices 120 combinations of screening digests and matching criteria that are expected to result in a significant number of irrelevant data units. This approach makes it more difficult for a malicious individual to identify where sensitive data is located. At the same time, by appropriately using metadata to sort through the large numbers of received data units, the central processing facility 110 often will be able to efficiently allocate its resources.

Next, in step 168 central processing facility 110 performs additional screening processing on the received characteristic information regarding matching data units according to the prioritization order (if any) determined in step 167, e.g., so as to identify documents, files or other data units of interest. As noted above, such processing preferably is guided by reference to the metadata that was received with a particular data unit and the relationships between individual SDIs known to the central processing facility 110. In certain embodiments, at this step central processing facility 110 focuses on information in the unit of a whole document or file. Accordingly, in such embodiments, in some cases multiple data units are combined to produce a single entire document or file.

In any event, the specific processing preferably depends upon the particular type of the characteristic information. If the characteristic information includes only full scan digests, then the central processing facility 110 preferably confirms whether the matches correspond to the actual chunk matches or whether they are simply accidental collisions resulting from the use of abbreviated hashes. On the other hand, if the full data unit has been received, then additional document analysis techniques can be performed. In one embodiment, the processing is performed in two stages: first, the full scan digests are analyzed and then, if additional processing is desired, the full matching data unit is requested, received and then processed in additional detail.

In either event, assuming that some characterization information already has been obtained from the embedded metadata, central processing facility 110 preferably first determines whether the corresponding information actually exists within the received data unit (or document or file). Also, in certain cases where the full matching data unit has been received, such as where a document potentially corresponds to a classified document, additional processing preferably is performed to determine whether other text within the actual classified document also exists within the received document, but was not picked up, e.g., due to imperfections in the chunking process. Because the universe of potential sensitive information has been significantly narrowed through the use of the metadata, such additional in-depth analysis is more practically achievable.

On the other hand, if no significant guidance has been achieved, central processing facility 110 preferably scans with respect to all designated sensitive information. Even in this case, more accurate results can be achieved because only the central processing facility 110 has access to the actual sensitive data and the corresponding full source digests pertaining to such data, not just screening digests (which preferably are abbreviated source digests intentionally designed to encompass a certain number of irrelevant documents). In any event, such processing preferably is performed in stages so that the central processing facility 110 can progressively narrow the universe of potentially applicable sensitive information.

As indicated above, preferably the main purpose of the processing performed in step 168 is to identify violations of policies 57. More preferably, the policies 57 identify what information can be located where and under what circumstances. For example, there might be a policy to provide an alert if any file on a laptop computer contains more than 100 employee names or any single instance of a name and associated social security number other than such information for the individual who is responsible for the laptop computer. Such policies preferably also are used by central processing facility 110 to constrain the universe of sensitive information that must be searched within any given file or document.

It is noted that for any file or other data unit under consideration, the central processing facility 110 can then compare against the full source digests 222 (e.g., cryptographic hash codes). Optionally, if the full matching data unit has been received, it could even compare against the original SDI data, which have been reverse-indexed by word or by the full source digests 222.

Typically, each of the policies 57 will have an action item associated with it, such as simply recording the existence of the document within SDI database 65, providing an alert (or sequence of alerts pursuant to a defined schedule) or report and/or (e.g., if the detection is made in real time or if sonic preventative action still is possible) blocking some activity (e.g., the transfer of a file onto a removable storage medium or the ability to access certain data). Accordingly, in step 170 the appropriate action is taken for each discovered policy violation (or, more generically because policies need not have negative connotations, each time a policy criterion is satisfied).

With respect to generating reports, there are likely to be many files that contain sensitive information distributed through the enterprise. To help make the voluminous output more usable, reports can be sorted by files that have the most SDIs found in them, users with the most apparent violations or any other criteria. In addition, or instead, central processing facility 110 could eliminate from the report files that have 'appropriate' access permissions, e.g. files on secured servers that are readable only to the owner of the file.

System Environment.

Generally speaking, except where clearly indicated otherwise, all of the systems, methods and techniques described herein can be practiced with the use of one or more programmable general-purpose computing devices. Such devices typically will include, for example, at least sonic of the following components interconnected with each other, e.g., via a common bus: one or more central processing units (CPUs); read-only memory (ROM); random access memory (RAM);

input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks, e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks; a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of scanning information across a plurality of devices, comprising:
    obtaining a set of designated chunks of information;
    generating full source digests based on the designated chunks and then deriving abbreviated source digests from the full source digests;
    distributing the abbreviated source digests to different data-processing devices to allow individual ones of the data-processing devices to scan locally stored data units to determine which of said data units satisfy a specified matching criterion pertaining to at least one identified match to at least one of the abbreviated source digests, the scanning comprising generating full scan digests for the stored data units, deriving abbreviated scan digests from the full scan digests, and then comparing the abbreviated source digests to the abbreviated scan digests;
    receiving, by a central processing facility, a plurality of the full scan digests for the data units that satisfy the specified matching criterion; and
    the central processing facility comparing the full scan digests received from the data-processing devices to the full source digests so as to determine which corresponding data units satisfy a policy criterion.

2. A method according to claim 1, wherein the data-processing devices perform said scanning at intervals over a period of time.

3. A method according to claim 1, wherein the policy criterion specifies that at least one of the designated chunks must be present within any data unit that matches the policy criterion.

4. A method according to claim 1, wherein the obtaining step comprises selecting particular chunks from an input data unit based on pre-specified selection parameters, and wherein the scanning to be performed by the data-processing devices comprises selecting particular chunks from the locally stored data units based on the same pre-specified selection parameters.

5. A method according to claim 1, wherein both the full source digests and the full scan data digests are cryptographic hashes.

6. A method according to claim 1, wherein the matching criterion is defined by reference to at least 1,000 of the abbreviated source digests.

7. A method according to claim 1, further comprising automatically performing, by the central processing facility, a pre-specified policy action corresponding to the policy criterion.

8. A method according to claim 1, wherein deriving the abbreviated source digests from the full source digests comprises shortening each of the full source digests to derive a respective one of the abbreviated source digests.

9. A method according to claim 8, wherein shortening each of the full source digests comprises truncating each of the full source digests to derive the respective one of the abbreviated source digests.

10. A method according to claim 1, further comprising:
distributing, by the central processing facility, the specified matching criterion to the data-processing devices.

11. A processing facility comprising:
a network interface to communicate over a network with data-processing devices; and
at least one central processing unit (CPU) to:
generate full source digests based on designated chunks of information;
derive abbreviated source digests from the full source digests;
distribute the abbreviated source digests to the data-processing devices to allow individual ones of the data-processing devices to scan locally stored data units to determine which of the data units satisfy at least one matching criterion pertaining to at least one identified match to at least one of the abbreviated source digests, the scanning comprising generating full scan digests for the data units, deriving abbreviated scan digests from the full scan digests, and comparing the abbreviated source digests to the abbreviated scan digests;
receive characteristic information regarding respective ones of the data units that satisfy the at least one matching criterion;
based on the characteristic information, determine whether the data units for which the characteristic information was received satisfy a policy criterion.

12. A processing facility according to claim 11, wherein the characteristic information comprises full scan digests for the data units that satisfy the at least one matching criterion, from which abbreviated scan digests used to determine whether the data units satisfy the at least matching criterion were derived.

13. A processing facility according to claim 11, wherein the at least one CPU is configured to, upon determining that one of the corresponding data units for which the characteristic information was received does not satisfy the policy criterion, perform a pre-specified policy action corresponding to the policy criterion.

14. A processing facility according to claim 11, wherein the characteristic information comprises cryptographic hashes of chunks of data within the data units that satisfy the at least one matching criterion, together with metadata pertaining to identified matches.

15. A processing facility according to claim 14, wherein the at least one CPU is to, based on the metadata, prioritize an order in which additional processing will be performed on said individual ones of the data units that satisfy the at least one matching criterion.

16. A processing facility according to claim 11, wherein the at least one matching criterion is defined by reference to at least 1,000 of the abbreviated source digests.

17. A processing facility according to claim 11, wherein the abbreviated source digests are derived from the full source digests by shortening each of the full source digests to derive a respective one of the abbreviated source digests.

18. A processing facility according to claim 17, wherein each of the full source digests is shortened by truncating each of the full source digests to derive the respective one of the abbreviated source digests.

19. A processing facility according to claim 11, wherein the at least one CPU is to further distribute the at least one matching criterion to the data-processing devices.

20. A computer-readable storage medium storing computer-executable instructions that upon execution by a particular data-processing device cause the data-processing device to:
receive abbreviated source digests from a central processing facility, wherein the abbreviated source digests are derived from full source digests generated based on designated chunks of information, wherein the received abbreviated source digests were distributed by the central processing facility to a plurality of data-processing devices;
scan locally stored data units to determine which of the data units satisfy at least one matching criterion pertaining to at least one identified match to at least one of the abbreviated source digests, wherein the scanning comprises:
generating full scan digests for the stored data units,
deriving abbreviated scan digests from the full scan digests, and
comparing the abbreviated source digests to the abbreviated scan digests;
sending, to the central processing facility, a plurality of the full scan digests for the data units that satisfy the at least one matching criterion to allow the central processing facility to compare the full scan digests to the full source digests to determine which corresponding data units violate a policy criterion.

21. A computer-readable storage medium according to claim 20, wherein deriving the abbreviated scan digests from the full scan digests comprises shortening each of the full scan digests to derive a respective one of the abbreviated scan digests.

22. A computer-readable storage medium according to claim 21, wherein shortening each of the full scan digests comprises truncating each of the full scan digests to derive the respective one of the abbreviated scan digests.

* * * * *